Oct. 28, 1952
T. C. POULTER
2,615,521
APPARATUS FOR SEISMIC EXPLORATION
Filed May 26, 1948
3 Sheets-Sheet 1
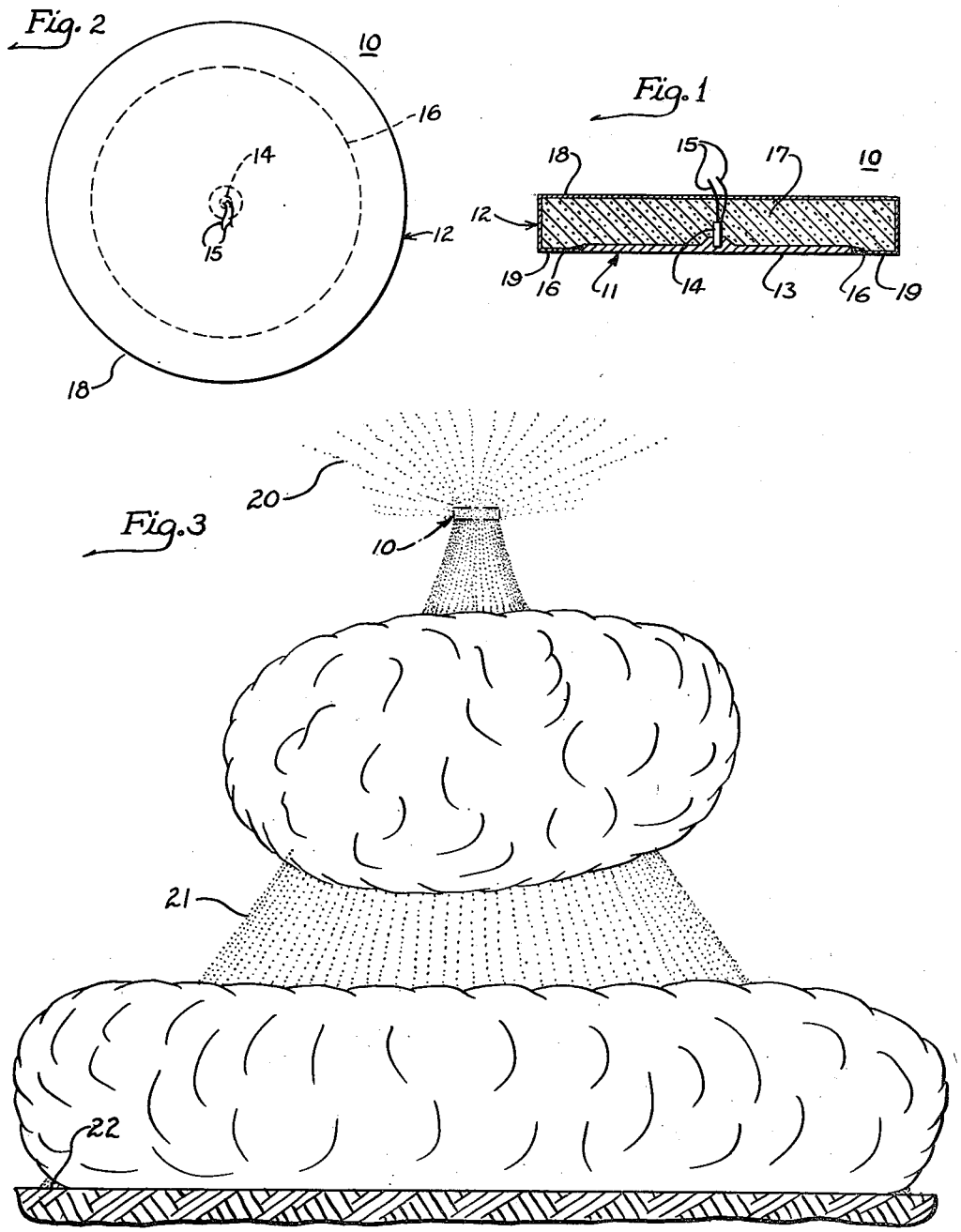
INVENTOR.
Thomas C. Poulter
BY
Carlson, Pitzner, Hubbard & Wolfe
Attys.

Oct. 28, 1952 T. C. POULTER 2,615,521
APPARATUS FOR SEISMIC EXPLORATION
Filed May 26, 1948 3 Sheets-Sheet 2

INVENTOR.
Thomas C. Poulter
BY

Oct. 28, 1952 — T. C. POULTER — 2,615,521
APPARATUS FOR SEISMIC EXPLORATION
Filed May 26, 1948 — 3 Sheets-Sheet 3
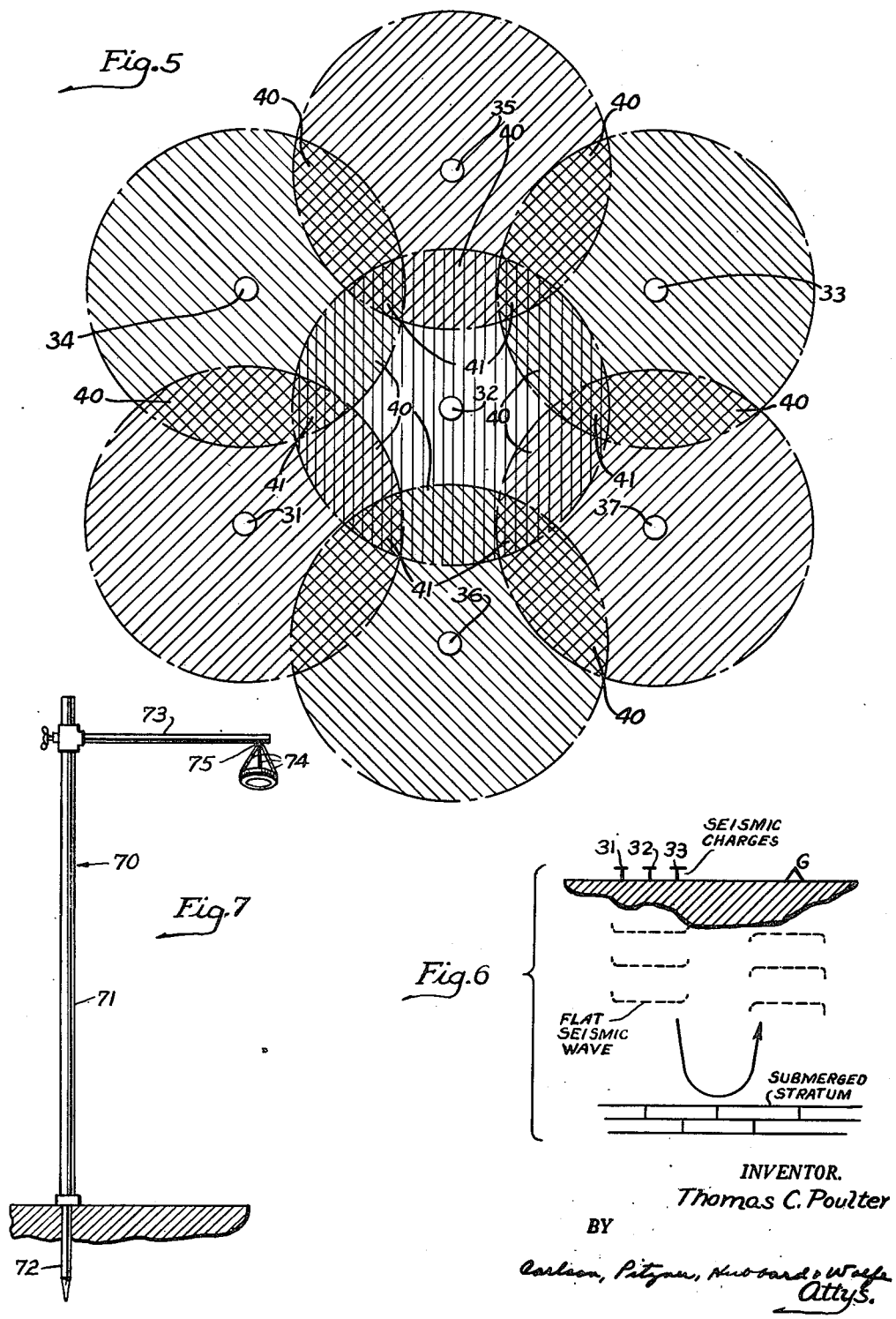
INVENTOR.
Thomas C. Poulter Patented Oct. 28, 1952

2,615,521

UNITED STATES PATENT OFFICE 2,615,521

APPARATUS FOR SEISMIC EXPLORATION

Thomas C. Poulter, La Grange, Ill., assignor to Institute of Inventive Research, San Antonio, Tex., a trust estate of San Antonio Application May 26, 1948, Serial No. 29,307

2 Claims. (Cl. 181—.5)

The present invention relates to geophysical exploration and more particularly to means for obtaining seismic reflections from underground strata. In my prior U. S. Letters Patent 2,454,380 which issued on March 13, 1951, seismic apparatus is disclosed including a plurality of explosive charges arranged in a pattern above the ground for setting up a seismic wave having directive properties. It is the object of the present invention to provide means for enabling the efficiency and directivity of the seismic wave to be improved. It is a more particular object to provide a seismic apparatus including an air-fired charge for setting up in the air a shock wave having improved directive qualities.

Other objects and advantages of the invention will become apparent as the discussion proceeds taken in connection with the accompanying drawings, in which:

Figure 1 shows a vertical section of a preferred form of explosive charge employed in practicing the present invention.

Fig. 2 is a plan view of the charge of Fig. 1.

Fig. 3 illustrates the explosion pattern resulting from the charge of Fig. 1 substantially as photographed, showing the direction of blast energy toward the ground.

Fig. 5 is a plan view of a group of seven flat charges spaced in such a manner as to cause overlap of the effective areas.

Fig. 6 is a diagram showing the seismic wave being reflected in the ground for pickup by a geophone spread.

Fig. 7 shows one way in which the charge may be mounted for firing.

Figure 4:
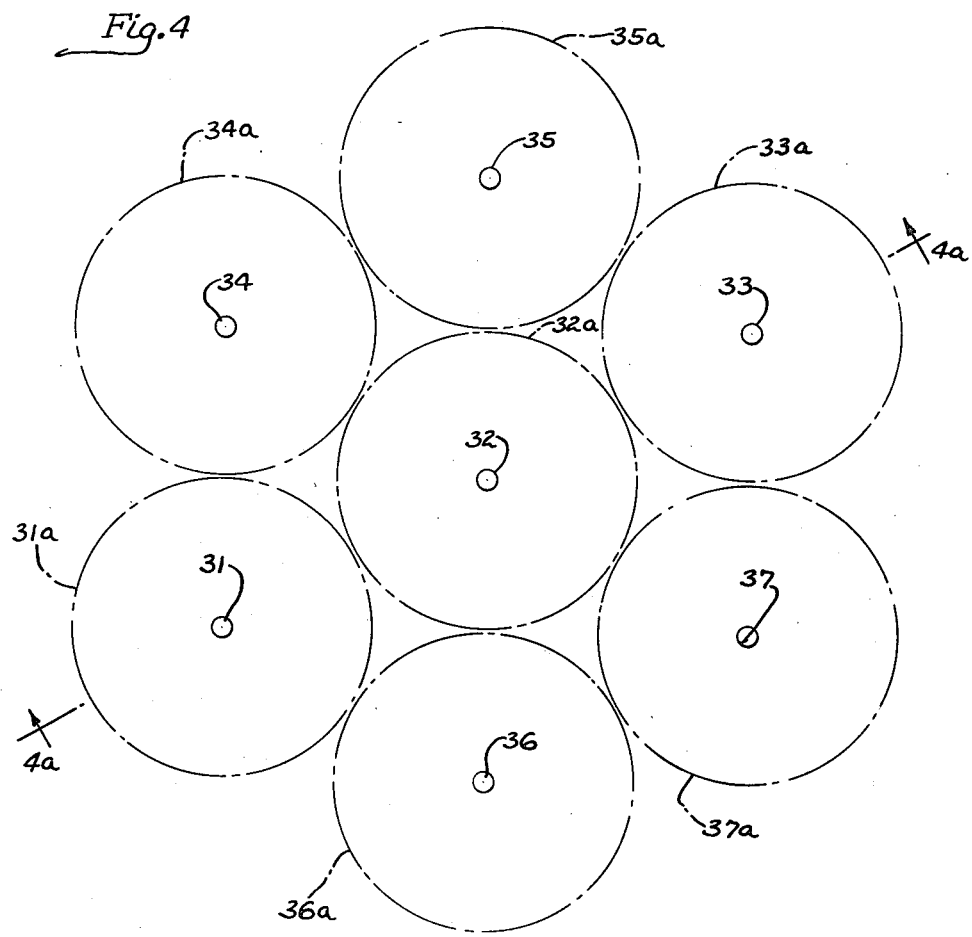
Fig. 4 is a plan view of a group of seven flat charges arranged so as to bring the effective areas of wave contact with the ground adjacent one another.

While the invention is susceptible of various modifications and alternative constructions and uses, I have shown in the drawings and will herein describe in detail certain preferred embodiments of the invention. It is to be understood, however, that I do not intend to limit the invention by such disclosure, but aim to cover all modifications and alterative constructions and uses falling within the spirit and scope of the invention as expressed in the appended claims.

In geophysical exploration and particularly in prospecting for oil it is necessary to locate domes and other significant strata quickly and with reasonable accuracy even when such structures exist at great depth. By way of introduction to the present invention, it is proposed to direct explosive energy by employing a particular air-fired charge or arrangement of charges to increase the magnitude of the reflected wave. In one modification a plurality of such charges are arranged above the earth in accordance with a predetermined pattern and then fired, preferably simultaneously. The resulting shock wave having a velocity above that of sound, striking the surface of the earth more or less flatly and without obstruction, produces a seismic wave having a generally flat wave front in the surface of the earth. By detonating even a single charge of explosive in the manner herein disclosed above the earth's surface, the wave front propagated through the earth may be substantially plane over a considerable area. The energy level and contour of the wave front, the extent of the area acted upon, and various additional factors cause the weathered surface layer as well as the deeper substrata to be readily penetrated. In addition to the improved penetration, the wave form and frequency characteristics are such as to enable a positive, easily interpreted trace to be obtained.

Referring now to Figs. 1 and 2, there is disclosed an explosive charge assembly 10 having a charge 11 in the form of a flat plate of explosive having a generally flat and extensive face 13. In the preferred form of the invention the charge 11 is in the form of a flat disk in which the thickness is but a small fraction of the lateral dimension. Centered within the charge is a blasting cap 14 which is connected by leads 15 to an appropriate firing device (not shown). The charge is preferably made of TNT or other type of high velocity explosive capable of setting up a shock wave in the air.

In the embodiment of the invention shown in Figs. 1 and 2, the charge 11 is covered by a shield 12 although the underside of the charge is unobstructed for the passage of a shock wave downwardly toward the ground. The shield 12 is arranged flatly adjacent the explosive body 11 and preferably consists of a container 18 of paperboard and filled with a mass 17 of weighty granular material such as sand. It has been found advisable to extend the periphery of the shield 12 around the edges 16 of the explosive to provide an annular edge portion 19. The latter may depend slightly beyond the charge 11 if desired without departing from the present invention.

In practicing the invention the charge assembly 10 is oriented above the surface of the earth so that the flat lower surface 13 of the charge is generally parallel to the surface of the earth. Upon detonation of the charge it is found that a shock wave is propagated from the face 13 which, at a short distance from the face, is substantially plane over a relatively wide area. In order to more fully understand the nature of the propagated wave reference is made to Fig. 3 which is a drawing based upon an actual photograph of a charge fired in darkness. The photograph was taken employing a one-pound charge, nine inches in diameter, and five-sixteenths of an inch thick, fired at an elevation of fifteen feet above the ground. While a slight "halo" 20 was noted, indicating that a portion of the energy is directed upwardly from the charge, by far the greater share of the energy is directed downwardly toward the earth as shown at 21. The shock wave front strikes the earth most forcefully in a generally circular area 22 and the resulting seismic wave is earth-conducted thereafter. With a setup such as disclosed in Figs. 1–3 and using a one-pound charge, which is but a small fraction of that employed in conventional seismic shooting, strong reflections have been obtained from depths in excess of ten thousand feet. The received signals have a minimum of extraneous reflections and are readily interpreted, even without resort to automatic volume control, "mixing," band pass filters and similar aids generally considered essential. The thickness of the charge may vary somewhat but it should preferably be in the range of one-tenth to one-fiftieth of the diameter. One-quarter inch is a practical minimum thickness since propagation will not take place evenly and reliably from the detonator at lesser thicknesses using the above types of explosives.

While sand has been found to be effective as a shielding mass, other weighty materials have also been found to produce a worthwhile shielding effect. In some localities, for example, it may be more convenient to use a somewhat thicker shield substituting packed earth in place of the sand. Liquids such as water have also been found to work satisfactorily. While the shield may be constructed of solid material such as a steel plate, the latter is not recommended since the shield might constitute a dangerous missile.

Since the downward concentration of energy toward the earth does not of itself account for the high energy level of the reflected signal, additional studies were made in an attempt to explain the extreme effectiveness of the charge herein disclosed. It was found that the explosion wave front resulting from the charge reaches the earth substantially simultaneously over the relatively large effective area indicated at 22. This is contrasted with air-fired charges previously used in which the explosion wave has a spherical envelope with the charge at the center thereof. In the case of the latter, contact of the explosion wave with the earth takes place first at a point directly under the charge and then in a progressively enlarging circle, the energy of the explosion being dissipated in all directions in the earth much the same as the energy is dissipated when employing a conventional shot hole. In practical applications of the present charge of which the pattern disclosed in Fig. 3 is representative, it is found that a disk charge only nine inches in diameter produces a substantially plane wave over a circular "effective area" having a radius of fifteen feet.

It is not fully understood just why the flat charge should produce a substantially flat wave front over such a large area, an area which is on the order of four hundred times as great as the area of the charge. Considering the geometry of the setup, a charge as small as nine inches in diameter would normally be considered as substantially a point charge at a distance of fifteen feet. It might be expected, therefore, that there would be very little difference in the nature of the wave front whether a flat charge were employed or whether the same amount of explosive were concentrated into a compact block as it is commercially supplied. One possible explanation of the apparent phenomenon involving flattening of the projected shock wave is that the velocity of the shock wave is greater at the periphery of the charge. This takes on special significance if it is assumed that the shape of the shock wave as it leaves the gaseous products of the detonation takes the shape of the exterior surface of the gaseous mass. Using the size of charge above mentioned, the flattening effect is quite pronounced at the preferred elevation of about fifteen feet. Larger charges may be placed somewhat higher. However, at elevations appreciably greater than fifteen feet, the entire wave front is slowed to the point where the velocity is the same as sound. Consequently, after the wave front reaches sonic velocity, the wave front tends to become more and more spherical and the fan-like spreading or dissipation of the energy associated with conventional explosive charges sets in. It is considered likely, too, that applying a supersonic explosion wave to the earth causes a more effective transfer of energy thereto than is obtained by contacting the earth with a wave of sonic velocity. Studies indicate that there are other disadvantages in exploding the charge of the approximate size set forth at an elevation of considerably greater than fifteen feet as will later appear. Suffice it to say for the present that the present procedure makes valuable use of air transmission to produce a substantially plane wave without, however, causing the wave to travel such a distance through the air that energy loss and other disadvantages associated with air firing of charges become effective.

Figure 4A:
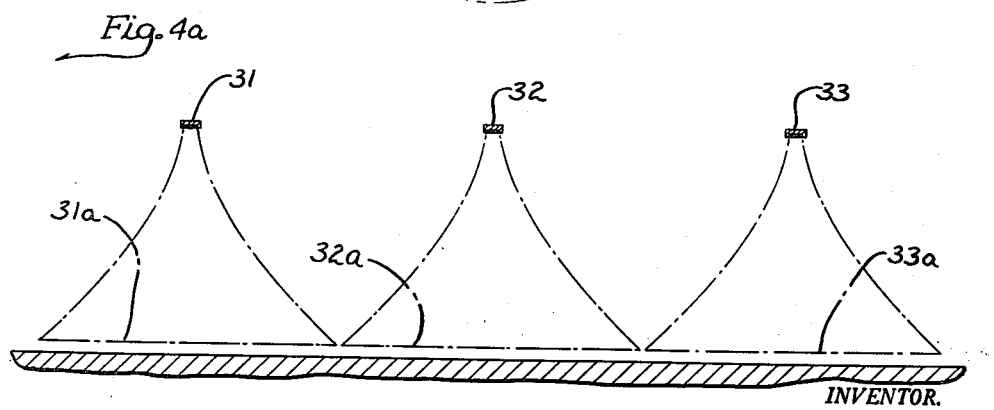
Fig. 4a shows the explosion pattern for adjacent charges taken along line 4a—4a of Fig. 4.

In order to increase the effective area and the total amount of energy in the wave front, a number of charge assemblies may be spaced in a pattern above the earth. One such pattern consisting of a cluster of seven charge assemblies 31—37 located on approximately thirty foot centers is shown in Fig. 4. A cross section in elevation and showing the explosion patterns of the charge assemblies 31, 32 and 33 is shown in Fig. 4a. The wave fronts of the individual charge assemblies are indicated at 31a, 32a and 33a respectively. To keep the wave fronts of the individual charge assemblies in step so that they merge into a single broad wave front, it is desirable to arrange the charge assemblies at the same elevation above the earth and to fire them at the same instant.

Tests have shown that employing small charges on the order of one pound and firing a number of them simultaneously constitutes a much more efficient use of explosive than if all the explosive charge were concentrated in a single large charge assembly. While it is true that arranging a plurality of charges, as shown in Figs. 4 and 4a, consumes more time than the placing of a single charge of larger size, nevertheless the mounting means (as will be more fully covered) may be sufficiently simple so that the additional setup time is extremely small.

While the wave fronts 31a—37a are substantially flat, it is well to consider at this point the variation in intensiy progressing outwardly toward the periphery of the effective area. Studies show that the intensity tends to remain constant throughout the central portion of the effective area, tapering off as the edges are approached in accordance with a more or less bell-shaped intensity curve. Thus, while each of the charges can be considered as "beaming" energy into the earth, it is to be noted that there is no sharp discontinuity at the periphery of such beam. Consequently, loss in sonic energy at the periphery may be reduced to a minimum. In practicing the present invention I take the reduction of intensity at the fringe region into account by spacing the charge assemblies somewhat more closely together than the diameter of the effective areas. The latter is shown in Fig. 5 in which the effective areas are caused to overlap to an extent of approximately fifty percent. This produces reenforcement of the wave front at the double-shaded areas 40 and still greater reenforcement at the triple-shaded triangular areas 41. The intensity in the areas 41 is very nearly the same, however, since the intensity components at 41 are of lesser magnitude. It will be apparent to one skilled in the art that fine adjustment of spacing to produce a wave front of substantially uniform intensity may be determined by trial and adjustment using conventional intensity measuring devices distributed on the ground below the group of charges. It will be found in general that an approximately fifty percent overlap as illustrated produces a wave front which is of fairly uniform intensity except at the periphery of the group. Here there will be a dropping off of intensity which is desirable since, as mentioned above, this eliminates a sharp boundary condition at the periphery of the beam.

Fig. 6 shows diagrammatically the path of the seismic wave from the pattern of charges to the submerged stratum or horizon thence to a geophone spread G.

Since the charge assemblies disclosed herein are extremely light and readily handled, placement is much simpler than in the case of conventional charges. The fact that the greater share of the energy is directed almost straight down enables the charge to be suspended from an extremely light L-shaped support as disclosed at 70 in Fig. 7. This support preferably includes an upright portion 71 constructed of pipe and approximately fifteen to twenty feet in length telescoped over a sharpened stake 72 at its lower end. Adjustably mounted at the top of the upright is an arm 73 which is constructed of light tubing having means at its outer end for suspending the charge assembly at the proper angle with respect to the earth. Conveniently this may be done by using three light suspension cords or rods 74 attached to a common point 75. The adjusted length of the cord 74 thus determines the degree of tilt of the charge assembly with respect to the earth. Upon explosion of the charge the arm 73 may be destroyed after prolonged use but it can be readily replaced. The upright 71 is affected hardly at all.

I claim as my invention:

1. An improvement in a seismic apparatus which comprises, in combination, a plurality of substantially flat plates of explosive, each of such plates having an extensive undersurface and having a thickness which is only a small fraction of the length and width dimensions thereof, means for supporting said plates laterally spaced from one another above the surface of the ground and with each of the plates generally parallel thereto and free of substantial obstruction to passage of a shock wave downwardly from said undersurface, means for firing the plates of explosive simultaneously, said plates being elevated substantially equally above the ground at such height that the waves set up in the air by the charges are still of supersonic velocity when they strike the ground for the setting up of a substantially flat seismic wave front having downwardly directive properties, and means including a geophone spread arranged in the path of the reflected wave front for recording the arrival of the same.

2. The subject matter as set forth in claim 1 in which the firing means includes caps located centrally in each of said plates of explosive.

THOMAS C. POULTER.

REFERENCES CITED

The following references are of record in the file of this patent:

UNITED STATES PATENTS

| Number | Name | Date |
|---|---|---|
| Re. 17,242 | McCollum | Mar. 19, 1929 |
| 16,473 | Eads | Jan. 27, 1857 |
| 450,774 | Schlenker | Apr. 21, 1891 |
| 1,867,098 | Rieber | July 12, 1932 |
| 1,978,668 | Burg | Oct. 30, 1934 |
| 2,064,451 | Voorhees | Dec. 15, 1936 |
| 2,133,484 | Sherar | Oct. 18, 1938 |
| 2,247,169 | Gilbertson | June 24, 1941 |
| 2,340,314 | Farnham | Feb. 1, 1944 |
| 2,506,836 | Kaltenberger | May 9, 1950 |
| 2,545,380 | Poulter | Mar. 13, 1951 |

FOREIGN PATENTS

| Number | Country | Date |
|---|---|---|
| 701,747 | France | Mar. 21, 1931 |

OTHER REFERENCES

Tsvetaev, "An Experiment of Application of Air Explosure," article in "Applied Physics," USSR, April 1, 1945, pages 82-87.